United States Patent
Andersson et al.

[11] Patent Number: 6,021,219
[45] Date of Patent: Feb. 1, 2000

[54] METHODS AND APPARATUS FOR DISTINGUISHING AMONG SEVERAL VISUAL PATTERNS

[75] Inventors: Russell L. Andersson, Manalapan; Howard M. Singer, Marlboro, both of N.J.

[73] Assignee: Lucent Technologies Inc., Murray Hill, N.J.

[21] Appl. No.: 08/782,011

[22] Filed: Jan. 7, 1997

[51] Int. Cl.[7] ............................. G06K 9/46; G06K 9/66; G06K 9/50; G06K 9/62

[52] U.S. Cl. ......................... 382/190; 382/201; 382/209; 382/282

[58] Field of Search ..................... 382/164, 165, 382/190, 175, 287, 292, 201, 224, 225, 282, 209; 348/587, 592

[56] References Cited

U.S. PATENT DOCUMENTS

| | | | |
|---|---|---|---|
| 5,103,489 | 4/1992 | Miette | 382/48 |
| 5,237,628 | 8/1993 | Levitan | 382/175 |
| 5,642,442 | 6/1997 | Morton et al. | 382/227 |
| 5,729,630 | 3/1998 | Ikeda | 382/229 |
| 5,751,847 | 5/1998 | Wuyts | 382/165 |

*Primary Examiner*—Leo H. Boudreau
*Assistant Examiner*—Dmitry A. Novik

[57] ABSTRACT

A method and apparatus for controlling the operation of a video system such as a video game system through recognition of a visual pattern, or key. For example, the presence and identity of the key may enable and select certain features of the video system. The key may suitably consist of a locator mark and a selector mark, the presence of the locator mark identifying the presence of a key, and the selector mark identifying the particular key present. A key recognition system detects the presence of the locator mark and identifies the selector mark. The locator mark is preferably of a distinctive color, readily distinguishable from background objects. The selector mark may be chosen from a limited set of colors, and the color of the selector mark may then be identified to identify the key being used. In another aspect, the locator mark is located in a particular position within the selector mark and is then used by the key detector to scale a rectangle about the selector mark. The selector mark is reduced by processing within the key detector to a reduced invariant image characterization. This reduced invariant image characterization is then compared against image data characterizations stored in a dictionary to identify the particular selector mark, and thus particular key.

40 Claims, 5 Drawing Sheets

METHODS AND APPARATUS FOR DISTINGUISHING AMONG SEVERAL VISUAL PATTERNS

FIELD OF THE INVENTION

The present invention relates generally to pattern recognition by a video system. More specifically the invention relates to a way to detect the presence and identity of one of several known keys in the field of view of a video camera, the keys being used to control the operation of a video system. The presence or absence of a particular key may suitably enable or disable certain features of the video system.

BACKGROUND OF THE INVENTION

The present invention relates to a way to control the operation of a video system by enabling it to recognize one of several known visual patterns in the field of view of a video camera. Control of a video system, such as a video game or virtual reality system, through the visual recognition and tracking of a passive control device, or prop, is known in the art. Such a method of control allows the user considerable freedom of motion, and allows a number of different control devices to be provided at low cost, since the control device need not contain any electronics, but needs only have visual characteristics suitable for furnishing control inputs.

SUMMARY OF THE INVENTION

As discussed further below, however, a variety of improvements to such systems have now been recognized to be desirable. By way of example, it has been recognized that it would also be useful in such a system to provide a way to simply recognize the presence or absence of an additional visual pattern or patterns. If a video game system, for example, is able to recognize one of several additional visual patterns, it can be provided with "keys" at the start of a game. The key may be added to a portion of a prop already used for control, or to a separate item intended to carry the key. The key may enable the system to automatically select, for example, level of difficulty, characters in a game, weapons, or mode of play. Such a technique would greatly simplify or eliminate startup menus at the beginning of a game, for example. Instead of requiring the user to select from various options, the system would simply search for the presence or absence of various keys. Furthermore, keys could be produced and marketed which enabled free play modes or special features of a video game.

For example, the key and key recognition system of the present invention can be used to enable game options. In a Dungeons and Dragons® type of game, for example, these could include race (human, troll, dwarf, elf, etc.), character, class, and weapon choice. As a further example, a key used for an air combat game could select a starting aircraft type.

Keys could also be used to enable cheats, or, in other words, undocumented game features usually designed into a game to assist the designers in debugging and left in the game after it is released. Cheats are popular among players in the initial stages of learning a game, especially violent games, as the cheats allow them more ease and comfort in familiarizing themselves with the game. Moreover, even after one has become proficient at a game it is sometimes relaxing its use, for example, an invulnerability cheat and commit wholesale slaughter without fear of harm. Other popular cheats include noclip, giving a user the ability to walk through walls, and full weapons ammo. Keys enabling these cheats could be designed and marketed to players desiring to utilize such features.

To operate properly in a video system, a key recognition system should desirably possess the following characteristics: it should be robust to lighting and expected geometric distortions; it should reliably recognize known keys; it should not spuriously detect keys; it should rapidly locate the key, independent of the position of the key in the image; it should use simple, space-efficient keys; and it should consume a minimum of system resources.

Thus, there exists a need in the art for a key location and recognition system which can operate in a video system to locate and identify a known pattern to provide information for controlling the system.

To this end, a key recognition system in accordance with one embodiment of the present invention may suitably employ a key consisting of a locator mark and a selector mark, and a system for recognizing the locator and selector marks. The locator mark allows the key to be located in the image, and is independent of the selector mark. Preferably, the locator mark is the same for all selector marks to be recognized by a particular recognition system. It is possible for a key recognition system of the present invention to select from a number of possible locator marks, but the more possible locator marks there are, the greater is the potential for increasing the complexity of the search and thereby reducing the speed of the search. However, it will be recognized that if a key is to be used on a prop, prop design requirements and overall system demands may require the use of more than one kind of locator mark.

The locator mark is preferably of a distinctive color, and chosen from a limited range of shapes. The locator mark is preferably located at or near the center of the selector mark. The size of the locator mark is preferably held to a specified ratio of the size of the selector mark. Thus, upon detection and measurement of the locator mark, the key recognition system is able to accurately compute the size of the selector mark. The locator mark also should contain enough information to accommodate the expected degrees of freedom of the selector mark, and the geometry of the locator mark should be selected with that consideration in mind.

Regardless of the particular locator geometry chosen, the locator is selected so as to be easy to find in a video image. This may be done by making the locator mark a unique color, typically bright with a high degree of chrominance. This design facilitates a chroma-based extraction from the background image.

In one embodiment of the present invention, once a video frame is captured and examined, the locator mark, if present, is identified through its unique color. Its area is then computed and its radius computed from the area. A rectangle is then constructed about the selector mark. This is possible because each key is chosen to have a locator mark of the same size relative to the selector mark, and located in the same area of the selector mark.

Once the rectangle is constructed about the selector mark, thus identifying that portion of the input image which constitutes the selector mark, the input image is preferably reduced to a smaller characterization which is largely invariant to image distortions. The reduced, invariant characterization may then be compared against members of a set of characterizations stored in a selector mark dictionary. The matching characterization is identified as the key, and the parameters and features associated with the key are then implemented.

A more complete understanding of the present invention, as well as further features and advantages of the invention, will be apparent from the following Detailed Description and the accompanying drawings.

DETAILED DESCRIPTION

Figure 1:
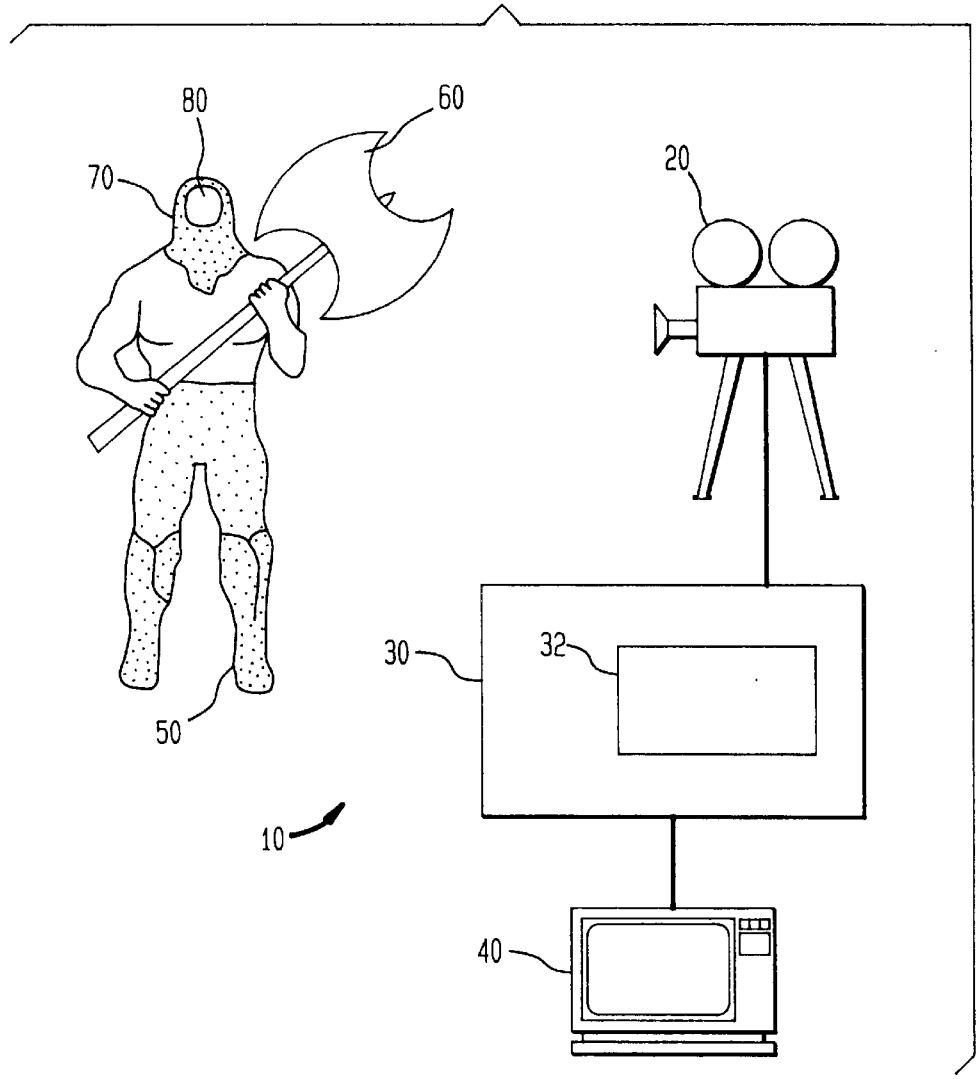
FIG. 1 illustrates a video game system using a key and key recognition system in accordance with the present invention.

FIG. 1 illustrates a video game system 10 using a key 80 and key recognition system 32 in accordance with the teachings of the present invention for utilization in conjunction with a video game system as described more fully below. A camera 20 surveys the field of play and transmits video signals to a video game console 30, which in turn drives a video display 40. A player 50 is playing a video game, using a passive prop 60 and wearing a hat 70 bearing a key 80. The key recognition system 32 locates and identifies the key 80, and transmits the identity of the key 80 to game control circuitry, defining automatically, for example, the difficulty setting at which the game is to be played, the character with which the player 50 is to be identified, or the enablement or disablement of various powers or tricks to enhance game play.

Figure 2:
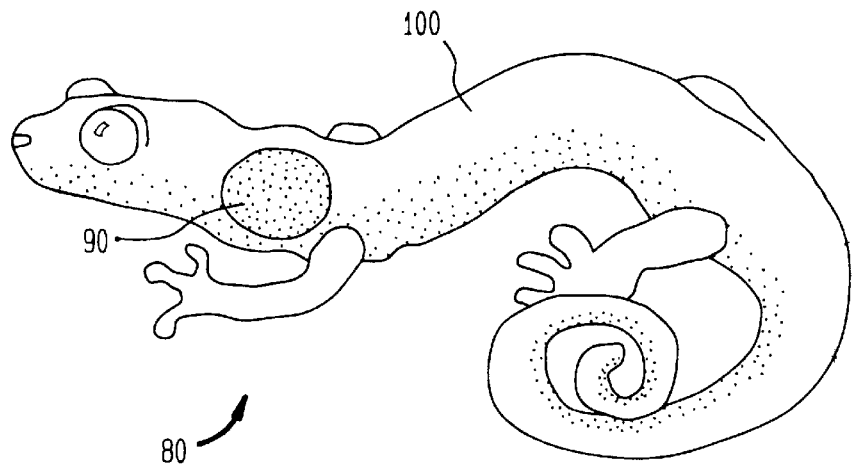
FIG. 2 illustrates one key in accordance with the present invention, the shown key illustrating suitable embodiments of locator and selector marks.

FIG. 2 is a more detailed view of the key 80 employed in the play of the video game system 10 illustrated in FIG. 1. The key 80 includes a locator mark 90 and a selector mark 100. The locator mark 90 is preferably of a uniform size, shape, and color for all keys to be recognized by a particular configuration of the key recognition system of the present invention. The locator mark 90 is also located in a uniform position within or near the selector mark 100. This allows the key recognition system 32 to reliably identify the selector mark 100, because the selector mark 100 will always be within a certain field with respect to the locator mark 90. The selector mark 100, in contrast to the locator mark 90, can be any of a number of different shapes or colors. In one embodiment of the key recognition system 32, the selector mark is simply chosen from one of a number of predetermined colors, different from the color of the locator mark 90. In order to recognize the selector mark 100, the key recognition system 32 simply searches through a dictionary of candidate colors over the course of several frames. In an alternative embodiment of the invention, the selector mark 100 is chosen from any of a number of colors and shapes, preferably distinct from one another, and the key recognition system 32 performs processing which identifies the selector mark 100 by analyzing both the color and the shape of the selector mark 100.

As will be discussed further below, the key need not be of the shape illustrated in FIG. 2, but can be much simpler in design. A key could, for example, consist of a locator mark surrounded by a selector mark which consisted merely of a monochromatic rectangle. However, the key 80 illustrated in FIG. 2 illustrates significant advantage of the present invention. Because of the complexity of the key which is allowed by the key and key recognition system of the present invention, keys such as key 80 can be designed so as to have independent esthetic appeal, and moreover, to be designed in shapes that relate to the concept of a video game, thus enhancing the overall game experience.

Figure 3:
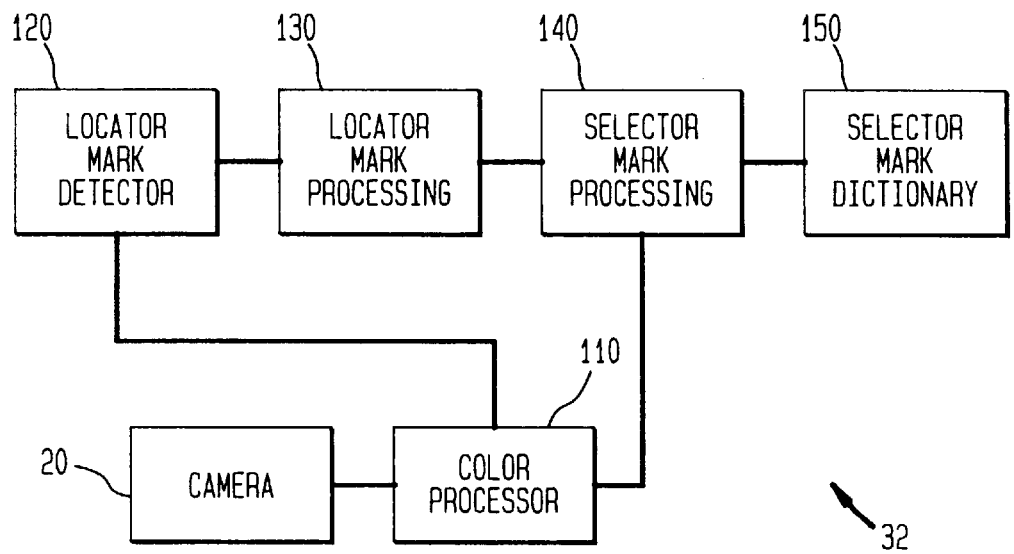
FIG. 3 is a more detailed illustration of the key recognition system of the present invention.

FIG. 3 is a more detailed illustration of the key recognition system 32 of the present invention, with camera 20 also shown for clarity of explanation. Camera 20 continually observes the field of play and provides video signals to the key recognition system 32. Key recognition system 32 may suitably consists of a color processor 110, a locator mark detector 120, a locator mark processor 130, a selector mark processor 140, and a selector mark dictionary 150.

The color processor 110 receives visual information about the field of play from camera 20 and transmits this information to the locator mark detector 120. The locator mark detector 120 examines the data received from the color processor 110 and examines the data for the distinctive color of the locator mark 90. Upon detection of the locator mark 90, the locator mark detector 120 transmits the data to the locator mark processor 130, which examines the video data to determine the area of the locator mark 90. The radius of the locator mark is then computed from the area. The locator mark processor 130 then uses the radius of the locator mark 90 to scale a rectangle to just encompass the selector mark 100. This is possible because the locator mark 90 and selector mark 100 are chosen so that the size and location of the selector mark 90 are the same for every key 80. Depending on the nature of the locator mark, the locator mark may supply the angular orientation for the selector mark or the selector mark may be assumed to have a known orientation with respect to the camera based upon knowledge of how the prop will normally be employed. For example, a standing user wearing a t-shirt will typically present a key on the t-shirt within a typical range of angles or orientations with respect to the camera.

The locator mark processor 130 transmits the video data relating to the rectangle to selector mark processor 140. The selector mark processor 140 performs processing on the rectangle to perform image reduction, reducing the image to a smaller characterization which is largely invariant to image distortions, such as position, size, illumination, and possibly orientation. Further details of this processing are discussed below in conjunction with the discussion of FIG. 5. The selector mark processor 140 then compares the resulting reduced, invariant characterization to a collection of characterizations contained in the selector mark dictionary 150.

The key recognition system of the present invention is able to recognize and identify quite complex keys. This ability presents significant marketing opportunities. Because the key need not be restricted to a limited range of colors, but instead can be a drawing with independent esthetic appeal, and because the key recognition system is able to recognize the key 80 within any part of a fairly extensive field of view, a significant freedom of key design is available. The key 80 need not be a monochromatic geometric shape, but instead can be a picture of an animal, a character within a game, a military vehicle such as a tank, fighter aircraft, ship, or spaceship, a rank insignia, or whatever an artist wished to design within quite a large range of choices. There would be some color constraints, but these constraints would not significantly limit the artist's ability to create a visually pleasing design. This design could fit on garments such as t-shirts or caps which, in addition to contributing to game play, could have independent appeal as garments among the target market. The key could also be marketed as a photograph or painting, which could then be hung on a wall within the field of view of the video system camera.

Figure 4:
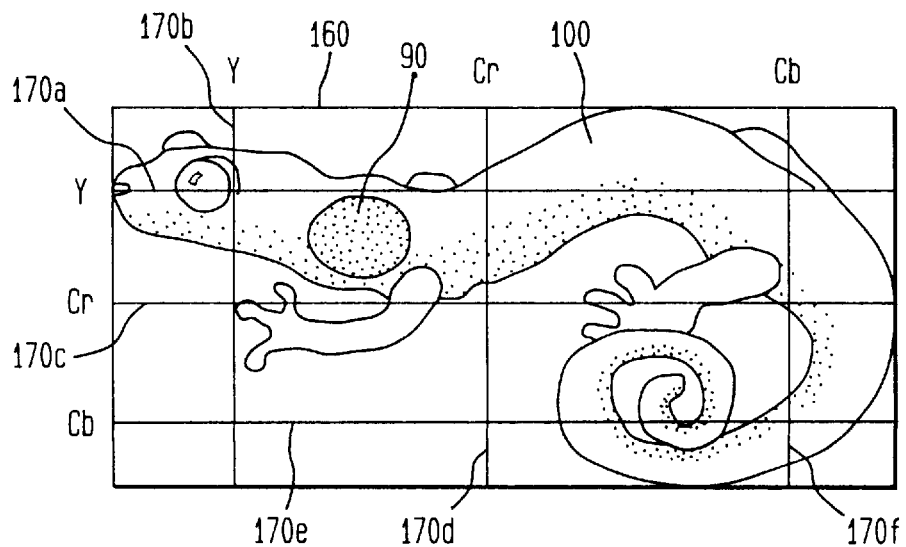
FIG. 4 is an illustration of a scaled rectangle constructed about a selector mark such as the selector mark of FIG. 2, by a locator detector according to the present invention.

FIG. 4 is an illustration of the scaled rectangle 160 containing the locator mark 90 and the selector mark 100. In the illustrated embodiment, rectangle 160 contains projection vectors 170a–f; horizontal and vertical luminance vectors, 170a and 170b; horizontal and vertical color difference vectors $C_r$, 170c and 170d; and horizontal and vertical color difference vectors $C_b$, 170e and 170f.

Figure 5:
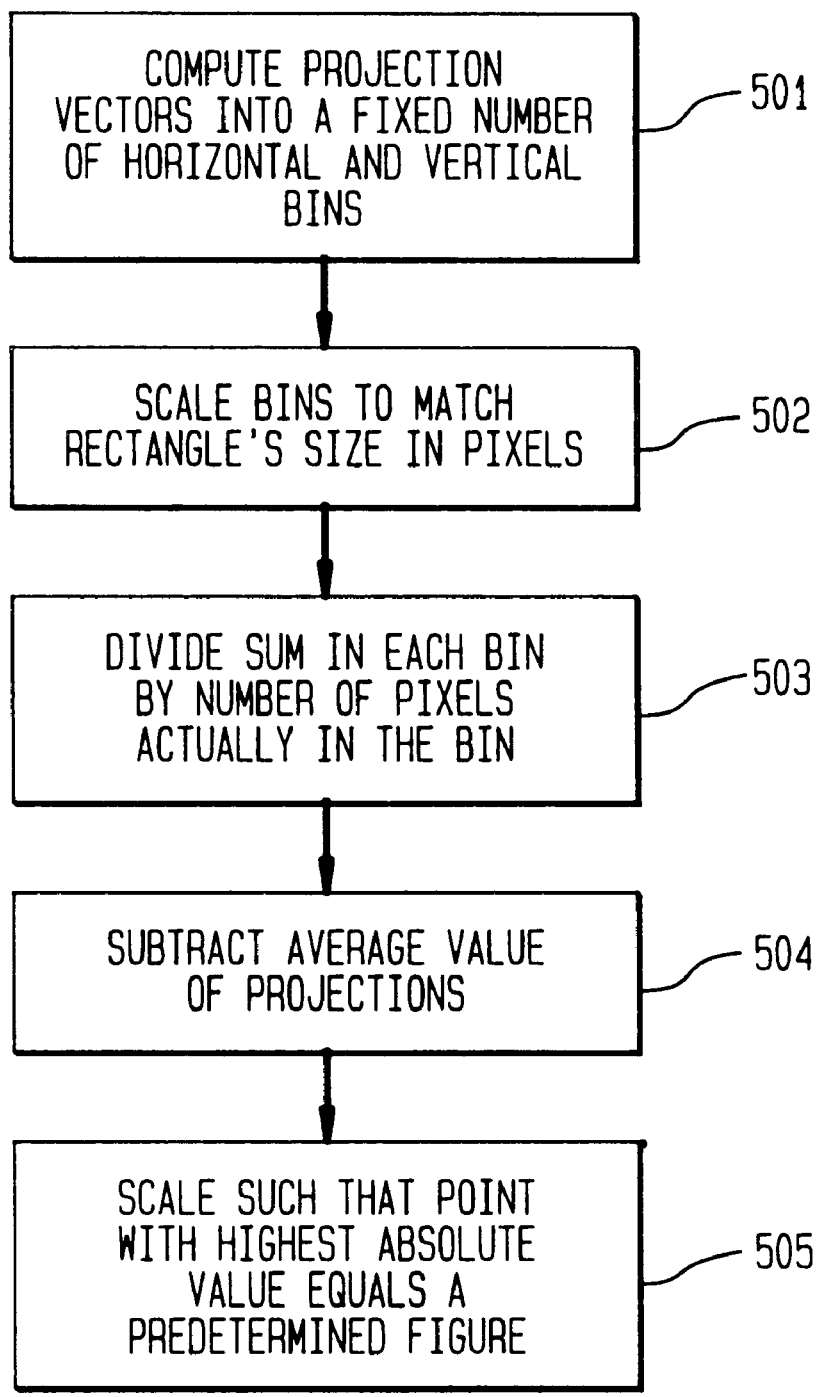
FIG. 5 is a flowchart showing the functional steps performed by one selector mark detector in accordance with the teachings of the present invention.

FIG. 5 is a flowchart illustrating the computational steps that may be suitably performed by selector mark processor 140 to reduce the input image represented by the rectangle 160 to a smaller, invariant characterization which can be looked up against the characterizations stored in the selector mark dictionary 150. In block 501, the projection vectors 170a–170f are sorted into a fixed number of horizontal and vertical bins. These bins are scaled to match the size of rectangle 160 in pixels. In block 502, the sum in each bin is normalized or divided by the number of pixels actually in the bin. In block 503, the projections 170a–170f are normalized. This is done by subtracting their average value and then scaling such that the point with the largest absolute value is exactly equal to a predetermined value. This normalization compensates for overall lighting effects, since the value of the point with the highest absolute value is adjusted to match a nominal value, and the rest of the values of the rectangle are then subjected to an equivalent adjustment. A band-pass filter can also be applied to reduce bin aliasing on the high frequency side, and to reduce slow lighting variations within the selector mark 100 on the low frequency side.

The illustrated embodiment preferably operates on 4:2:2 $YC_bC_r$ data. This is data consisting of luminance Y, and blue and red color ratios $C_b$ and $C_r$. Luminance is given a weight of 4, and each of the color ratios is given a weight of 2. As shown in FIG. 4, there are separate horizontal and vertical projections for luminance, and separate horizontal and vertical projections for each of the two color differences $C_b$ and $C_r$, resulting in a total of six projections. In the illustrated embodiment, 16 bins are preferably used for luminance, and 8 bins each are used for the color differences $C_b$ and $C_r$.

Different input images may result in different numbers of projections. Unless compensated for, a different image may result in an increased number of projections, resulting in greater processing complexity. For example, if the input consists of multiple binary color-keyed images, twice as many binary images will result as in other cases. This will result in a greater number of projections, with a concomitant increase in processing load. To reduce the number of projections, it may be convenient to difference pairs of binary images. This halves the number of binary images to be processed, and thus reduces the number of projections which must be processed. Selecting which binary images to pair may depend on the selector mark artwork. If binary images are paired in order to reduce the number of images which must be processed, the step of normalizing the projections to compensate for lighting effects, block 503 of FIG. 5, may be omitted.

Figure 6:
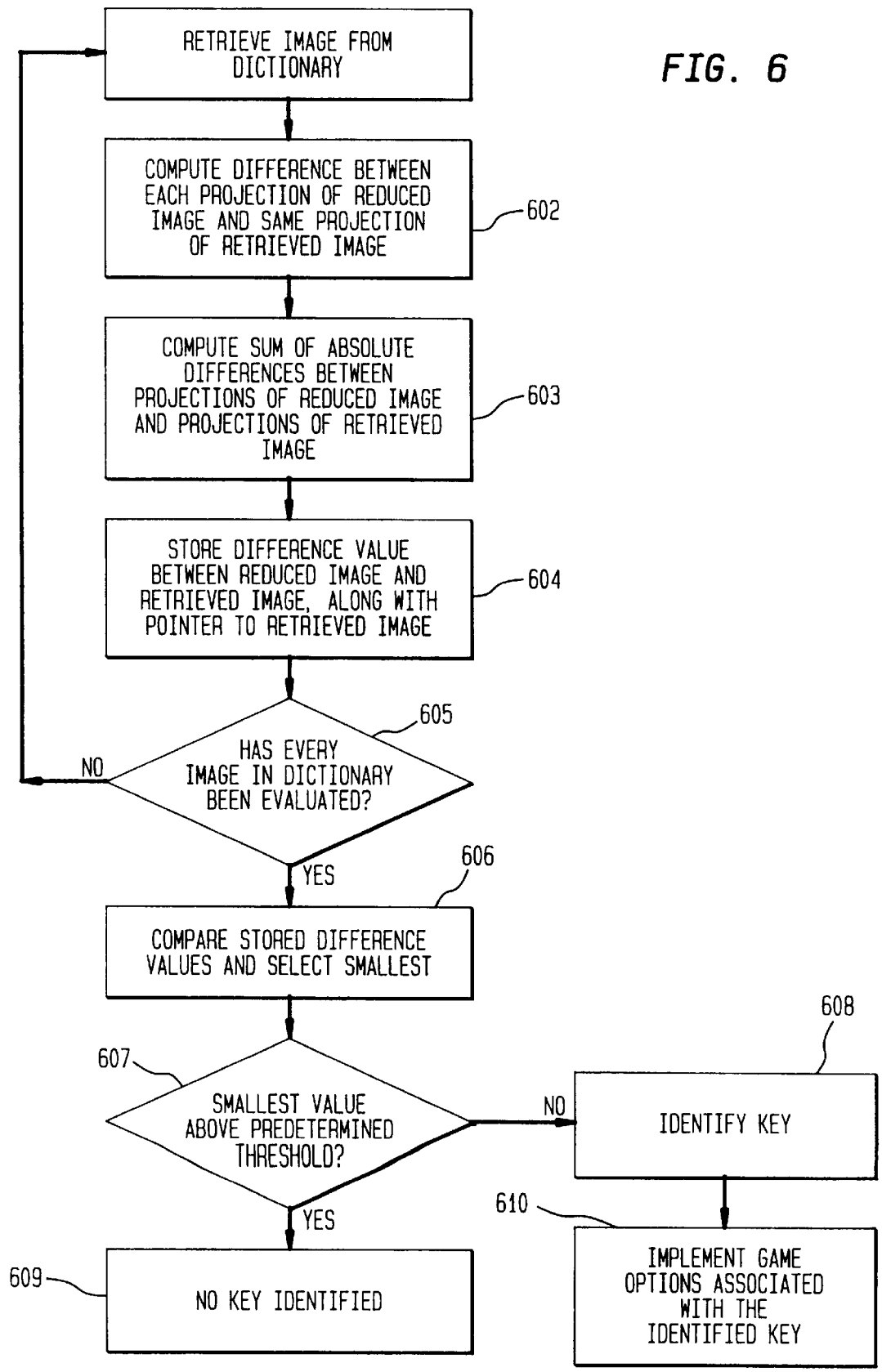
FIG. 6 is a flowchart showing the steps performed in comparing the reduced image produced by the selector mark detector against a selector mark dictionary in accordance with the teachings of the present invention.

FIG. 6 illustrates one suitable set of computational steps for matching the reduced image characterization against the selector mark dictionary 150. In block 601, a characterization is retrieved from the dictionary 150. In block 602, the difference is computed between each projection of the reduced characterization image and the retrieved characterization. In block 603, the sum of the absolute differences between the projections of the reduced characterizations and the projections of the retrieved image characterization is computed, giving equal weight to the component due to each projection. Weighting the components due to each projection is advantageous. For example, if the input data is in $YC_rC_b$ format, weighting each component by its original range may improve accuracy, by preventing the noise in a channel with little signal from swamping the signal from the other channels. In block 604, the difference value between the reduced image and the retrieved image is stored, along with a pointer to the retrieved image. In block 605, a determination is made as to whether every image in the selector mark dictionary 150 has been evaluated. If not, the control is transferred to block 601 and the process is repeated. If every characterization in the selector mark dictionary 150 has been evaluated, control is transferred to block 606. In block 606, the stored difference values are compared and the smallest value is selected. Control is then transferred to block 607, and the selected smallest value is compared against a predetermined threshold. If the selected smallest value is above the predetermined threshold, control is transferred to block 608 and no selector pattern is declared. If the selected smallest value is below the predetermined threshold, control is transferred to block 609. In block 609, the pointer associated with the selected smallest value is examined and the key is identified as the key associated with the pointer. Once the key is identified, control is transferred to block 610, and the various game options and parameters associated with the identified key are implemented.

This can be accomplished, for example, by setting a corresponding flag upon identification of a selector mark. Depending on the design of the video system, the flag could stay set through a game or could be reset when the selector mark left the field of view of the camera. Leaving the flag set throughout the game is advantageous for use of the key to select character features or other game features which would typically remain unchanged throughout the play of a game, while resetting the selector mark upon disappearance of the key is useful where the key is used to implement cheats. For example, a player might wish to turn on an invulnerability cheat to negotiate a particularly rough area of a game. He would then, for example, don a hat bearing a key which would implement the invulnerability cheat. When the player had negotiated the difficult area, he would then remove the hat, causing his character to revert to normal.

Figure 7:
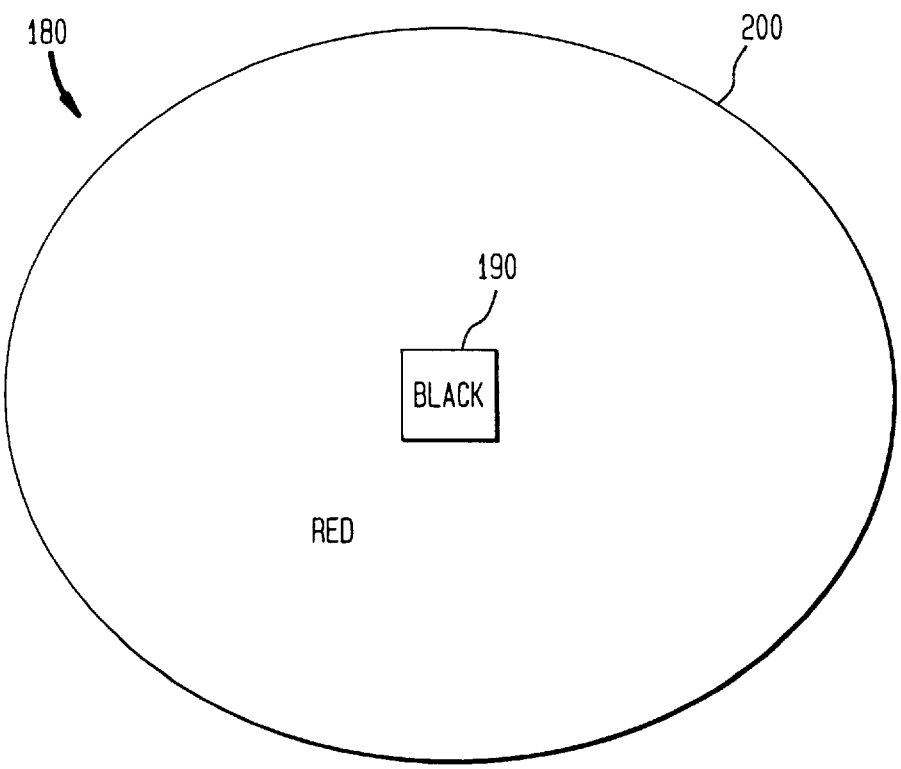
FIG. 7 illustrates a key which may suitably be employed in an alternative embodiment of the present invention.

An alternative embodiment of the present invention simply chooses selector marks from a limited set of colors and identifies a selector mark by detecting the color of the selector mark and looking up the selector mark color in a table or dictionary of possible colors. FIG. 7 illustrates a key 180 employed in this alternative embodiment of the present invention. The key 180 consists of a locator mark 190 and a selector mark 200. In this embodiment, both the locator mark 190 and the selector mark 200 are selected from a limited number of colors not likely to be duplicated in background objects in one chosen combination or colors or shapes. In this embodiment of the invention the locator mark 190 can be of any size or shape and can be placed inside or outside the selector mark 200. The selector mark 200 can also be of any size or shape, but is preferably chosen from a limited range of colors, and is preferably a single color.

Figure 8:
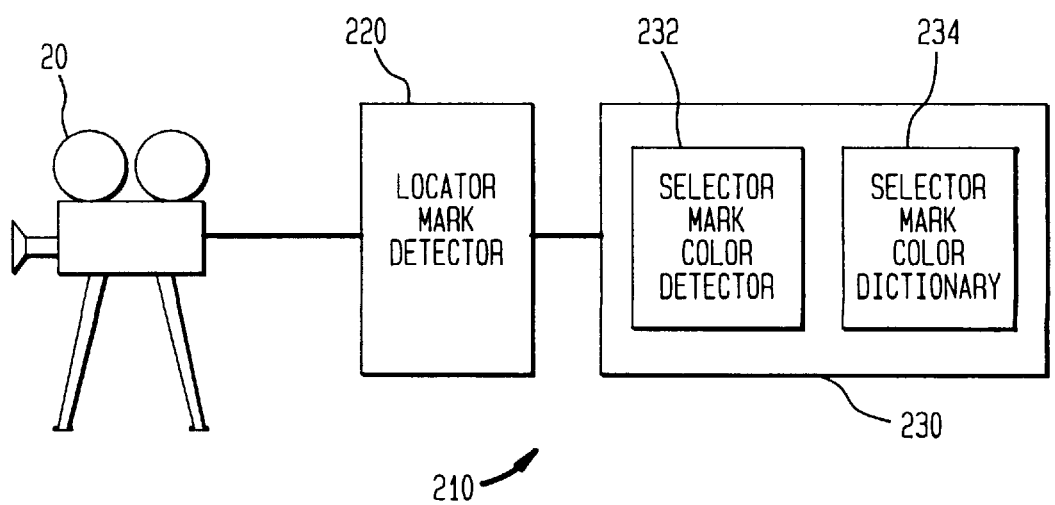
FIG. 8 illustrates one key identifier system in accordance with the present invention.

FIG. 8 illustrates a key identifier 210 in accordance with this alternative embodiment of the present invention. The key identifier 210 receives a video signal from a camera 200. The key identifier 210 consists of a locator mark detector 220, which is simply a color detector set to detect the color of the locator mark 190, and a selector mark identifier 230, which consists of a selector mark color detector 232 set to compare a detected color against entries in a color table or dictionary 234. When the locator mark detector 220 detects the presence of the locator mark 190 in the video signal, the selector identifier 230 is activated. The selector mark color detector 232 reads the color detected in a region adjacent to or contained within the locator mark or immediately surrounding the locator mark 190, and compares each color detected in the video frame against the eligible selector mark colors. When a selector mark color is detected, it is identified and the identity of the selector mark color is then passed along.

This embodiment of the invention provides for simpler processing. It is no longer necessary to perform processing of the locator mark in order to encompass the selector mark, and it is no longer necessary to reduce the selector mark. The only processing required is relatively simple color matching. More freedom is also available in the size, shape, and placement of the locator and selector marks. On the other hand, this embodiment of the present invention limits the colors available for the selector mark, and limits the design choices that can be made. For example, using this embodiment of the present invention it is inadvisable to employ a multicolored selector mark, as this is likely to overload the capabilities of a simple selector mark identifier in accordance with this embodiment of the invention.

While the present invention is disclosed in the context of a video game system, it will be recognized that a variety of implementations are possible consistent with the teachings of the present invention as limited solely be the appended claims. By way of example, a game key in accordance with the present invention my be given away as a promotional item by a vendor, such as a fast food restaurant or the like. A key may also be incorporated in a marking on a piece of clothing such as a hat or undershirt which may be sold to a game player to give the player free games or enable the player to have various powers or to assume various characters in a game when his or her key is constructed and recognized as taught by the present invention.

Further, as one example of the present invention's general applicability for video systems, the same methods and apparatus may be readily adapted and utilized for distinguishing patterns that could be used to identify the user of a multimedia service such as a video conference setup or facility. An appropriate pattern on a user "nameplate" or identification badge could be recognized and matched against stored data for the identified user to simplify the user interface and set up of the parameters of the service.

We claim:

1. A method for recognizing a visual pattern to control operation of a video system, said pattern consisting of a locator mark and a selector mark, said selector mark being one of a set of possible selector marks, comprising the steps of:
   receiving a frame of video data;
   detecting said locator mark within said frame of video data;
   determining a location of said selector mark based on a known size, position and orientation of said selector mark relative to said locator mark by defining bounds of said selector mark based on the known size, position and orientation of said selector mark relative to said locator mark;
   identifying, within said frame of video data, a visual image of said selector mark;
   reducing said visual image of said selector mark to a reduced characterization, said reduced characterization being largely invariant to lighting, distortion and orientation;
   comparing said reduced characterization against members of a set of stored characterizations, each of said stored characterizations being identified with one of said possible selector marks; and
   upon matching said reduced characterization with one of said set of stored characterizations, identifying said possible selector mark as a received selector mark.

2. The method of claim 1, wherein the step of detecting said locator mark within said frame of video data also includes computing an area of said locator mark and further computing a radius of said locator mark from said area of said locator mark.

3. The method of claim 2, wherein the step of identifying, within said frame of video data, a visual image of said selector mark further includes using said radius of said locator mark to construct a rectangle, said rectangle encompassing said selector mark.

4. The method of claim 3, wherein the step of reducing said visual image of said selector mark further includes computing within said rectangle each of a plurality of projection vectors and sorting these plurality of projection vectors into a fixed number of horizontal and vertical bins, said bins being scaled to match a size of said rectangle in pixels.

5. The method of claim 4, wherein the step of reducing said selector mark further includes normalizing each of said bins by a number of pixels in said bin.

6. The method of claim 5, wherein the step of reducing said selector mark further includes:
   computing an average value of said projection vectors;
   subtracting said average value from each of said projection vectors;
   identifying a point in one of said projection vectors having the greatest absolute value; and
   scaling each of said points so that said greatest absolute value of said point exactly equals a predetermined value.

7. The method of claim 5, wherein the step of reducing said selector mark further includes applying a band-pass filter.

8. The method of claim 5, in which said frame of video data consists of multiple binary color-keyed images, wherein the step of reducing said selector mark further includes differencing selected pairs of binary images.

9. The method of claim 6, wherein said locator mark is chosen to be of a unique color, and, for each of said possible selector marks, is of a uniform size and position relative to said selector mark, and is of a known shape.

10. The method of claim 8, wherein said locator mark is located within said selector mark.

11. The method of claim 1, wherein said selector mark is chosen from among a limited set of colors, said set of colors not including a color of said locator mark.

12. The method of claim 5 wherein said method is operative within a video game system said video game system being operative to track a passive prop, said prop furnishing inputs for the play of said video game system.

13. The method of claim 2 wherein said visual pattern is printed on a substrate, said substrate being an article of clothing to be worn by a user.

14. The method of claim 13 wherein said article of clothing is a t-shirt.

15. The method of claim 13 wherein said article of clothing is a hat.

16. A key recognition system for controlling the operation of a video system through recognition of a visual pattern detected in a received frame of video data, the system comprising:
   a key consisting of a locator mark and a selector mark, said locator mark being adapted to be detected in a frame of video data, detection of said locator mark serving to aid location of said selector mark based on a known size, position and orientation of said locator mark relative to said selector mark and to define bounds of said selector mark based on the known size, position and orientation of said locator mark relative to said selector mark, each of said locator mark and selector mark comprising a visual pattern, said selector mark being one of a set of possible selector marks;
   a locator mark detector system for identifying said locator mark; and
   a selector mark identifier for computing a location and bounds of said selector mark using previously predetermined information about said size, position and orientation of said locator mark relative to said selector mark, and identifying said selector mark.

17. The system of claim 16 wherein said locator mark is a pattern of a unique color.

18. The system of claim 17 wherein said locator mark and said possible selector marks are chosen such that all of said possible selector marks are of a uniform size and shape and said locator mark is of a uniform size relative to each of said possible selector marks, and is of a uniform shape.

19. The system of claim 18 wherein said locator mark is located within said selector mark, in a uniform position respective to each of said possible selector marks.

20. The system of claim 18 wherein said locator mark detector system includes:
   a video frame receiver for receiving frames of video data;
   a chroma-key detector for detecting areas of specified color within one or more of said frames of video data, said chroma-key detector being operable to detect said locator mark within one of said frames of video data;
   a locator mark processor for:
      computing an area of said locator mark;
      computing from said area of said locator mark a radius of said locator mark; and
      employing said radius of said locator mark to construct a rectangle encompassing said selector mark.

21. The system of claim 20 wherein said selector mark identifier includes a processor to obtain a reduced detected image characterization for a detected selector mark, said processor being operable to:
   compute within said rectangle each of a plurality of projection vectors into a fixed number of horizontal and vertical bins, said bins being scaled to match a size of said rectangle in pixels;
   normalize each of said bins by a number of pixels in said bin;
   compute an average value of said projection vectors;
   subtract said average value from each of said projection vectors;
   identify a point in one of said projection vectors having the greatest absolute value; and
   scale each of said points so that said greatest absolute value of said point exactly equals a predetermined value.

22. The system of claim 21 wherein said selector mark identifier also includes:
   a selector mark dictionary including a reduced stored image characterization for each of said possible selector marks;
   a comparison processor for:
      comparing said reduced detected image against each of said reduced stored image characterizations;
      computing a difference between said reduced detected image characterization and each of said reduced stored image characterizations; and
      declaring a match between said reduced detected image characterization and said reduced stored image characterization having a least difference with said reduced detected image characterization.

23. The system of claim 22 wherein said comparison processor also compares said difference between said reduced detected image characterization and each of said reduced stored image characterizations against a predetermined criterion, and declaring that no match exists when none of said differences meets said predetermined criterion.

24. The system of claim 16 wherein said locator mark is of a unique color, said selector mark is of a color selected from a set of distinctive colors, each of said colors being distinct from said color of said locator mark, and said locator mark detector is operative to detect said color of said locator mark, and said selector mark identifier is operative to detect said color of said selector mark and further to identify said selector mark by matching said color of said selector mark against said set of distinctive colors.

25. A method for recognizing a visual pattern to control operation of a video system, said pattern consisting of a locator mark and a selector mark, said selector mark being one of a set of possible selector marks, comprising the steps of:
   receiving a frame of video data;
   detecting said locator mark within said frame of video data by computing an area of said locator mark and further computing a radius of said locator mark from said area of said locator mark;
   identifying, within said frame of video data, a visual image of said selector mark by using said radius of said locator mark to construct a rectangle, said rectangle encompassing said selector mark;
   reducing said visual image of said selector mark to a reduced characterization by computing within said rectangle each of a plurality of projection vectors and sorting these plurality of projection vectors into a fixed number of horizontal and vertical bins, said bins being scaled to match a size of said rectangle in pixels and normalizing each of said bins by a number of pixels in said bin, said reduced characterization being largely invariant to lighting, distortion and orientation;
   comparing said reduced characterization against members of a set of stored characterizations, each of said stored characterizations being identified with one of said possible selector marks; and
   upon matching said reduced characterization with one of said set of stored characterizations, identifying said possible selector mark as a received selector mark.

26. The method of claim 25, wherein the step of reducing said selector mark further comprises:

computing an average value of said projection vectors;

subtracting said average value from each of said projection vectors;

identifying a point in one of said projection vectors having the greatest absolute value; and scaling each of said points so that said greatest absolute value of said point exactly equals a predetermined value.

27. The method of claim 25, wherein the step of reducing said selector mark further comprises applying a band-pass filter.

28. The method of claim 25, in which said frame of video data consists of multiple binary color-keyed images, wherein the step of reducing said selector mark further comprises differencing selected pairs of binary images.

29. The method of claim 26, wherein said locator mark is chosen to be of a unique color, and, for each of said possible selector marks, is of a uniform size and position relative to said selector mark, and is of a known shape.

30. The method of claim 28, wherein said locator mark is located within said selector mark.

31. The method of claim 25, wherein said selector mark is chosen from among a limited set of colors, said set of colors not including a color of said locator mark.

32. The method of claim 25 wherein said method is operative within a video game system said video game system being operative to track a passive prop, said prop furnishing inputs for the play of said video game system.

33. The method of claim 25 wherein said visual pattern is printed on a substrate, said substrate being an article of clothing worn by a user.

34. The method of claim 33 wherein said article of clothing is a t-shirt.

35. The method of claim 33 wherein said article of clothing is a hat.

36. A key recognition system for controlling the operation of a video system through recognition of a visual pattern detected in a received frame of video data, the system comprising:

a key consisting of a locator mark and a selector mark, each of said locator mark and selector mark comprising a visual pattern, said locator mark being a pattern of a unique color and said selector mark being one of a plurality of possible selector marks, said locator mark and said possible selector marks being chosen such that all of said possible selector marks are of a uniform size and shape and said locator mark is of a uniform size relative to each of said possible selector marks and of a uniform shape, said locator mark being located within said selector mark, in a uniform position respective to each of said possible selector marks;

a locator mark detector system for identifying said locator mark, said locator mark detector system including:

a video frame receiver for receiving frames of video data;

a chroma-key detector for detecting areas of specified color within one or more of said frames of video data, said chroma-key detector being operable to detect said locator mark within one of said frames of video data;

a locator mark processor for:

computing an area of said locator mark;

computing from said area of said locator mark a radius of said locator mark; and employing said radius of said locator mark to construct a rectangle encompassing said selector mark; and a selector mark identifier for identifying said selector mark.

37. The system of claim 36 wherein said selector mark identifier includes a processor to obtain a reduced detected image characterization for a detected selector mark, said processor being operable to:

compute within said rectangle each of a plurality of projection vectors into a fixed number of horizontal and vertical bins, said bins being scaled to match a size of said rectangle in pixels;

normalize each of said bins by a number of pixels in said bin;

compute an average value of said projection vectors;

subtract said average value from each of said projection vectors;

identify a point in one of said projection vectors having the greatest absolute value; and scale each of said points so that said greatest absolute value of said point exactly equals a predetermined value.

38. The system of claim 37 wherein said selector mark identifier also includes:

a selector mark dictionary including a reduced stored image characterization for each of said possible selector marks; and a comparison processor for:

comparing said reduced detected image against each of said reduced stored image characterizations;

computing a difference between said reduced detected image characterization and each of said reduced stored image characterizations; and declaring a match between said reduced detected image characterization and said reduced stored image characterization having a least difference with said reduced detected image characterization.

39. The system of claim 38 wherein said comparison processor also compares said difference between said reduced detected image characterization and each of said reduced stored image characterizations against a predetermined criterion, and declaring that no match exists when none of said differences meets said predetermined criterion.

40. The system of claim 36 wherein said locator mark is of a unique color, said selector mark is of a color selected from a set of distinctive colors, each of said colors being distinct from said color of said locator mark, and said locator mark detector is operative to detect said color of said locator mark, and said selector mark identifier is operative to detect said color of said selector mark and further to identify said selector mark by matching said color of said selector mark against said set of distinctive colors.

* * * * *